Aug. 18, 1931.  L. A. NEMCOVSKY  1,819,035
EYE MOUNTING FOR DOLLS
Original Filed May 13, 1927   3 Sheets-Sheet 1
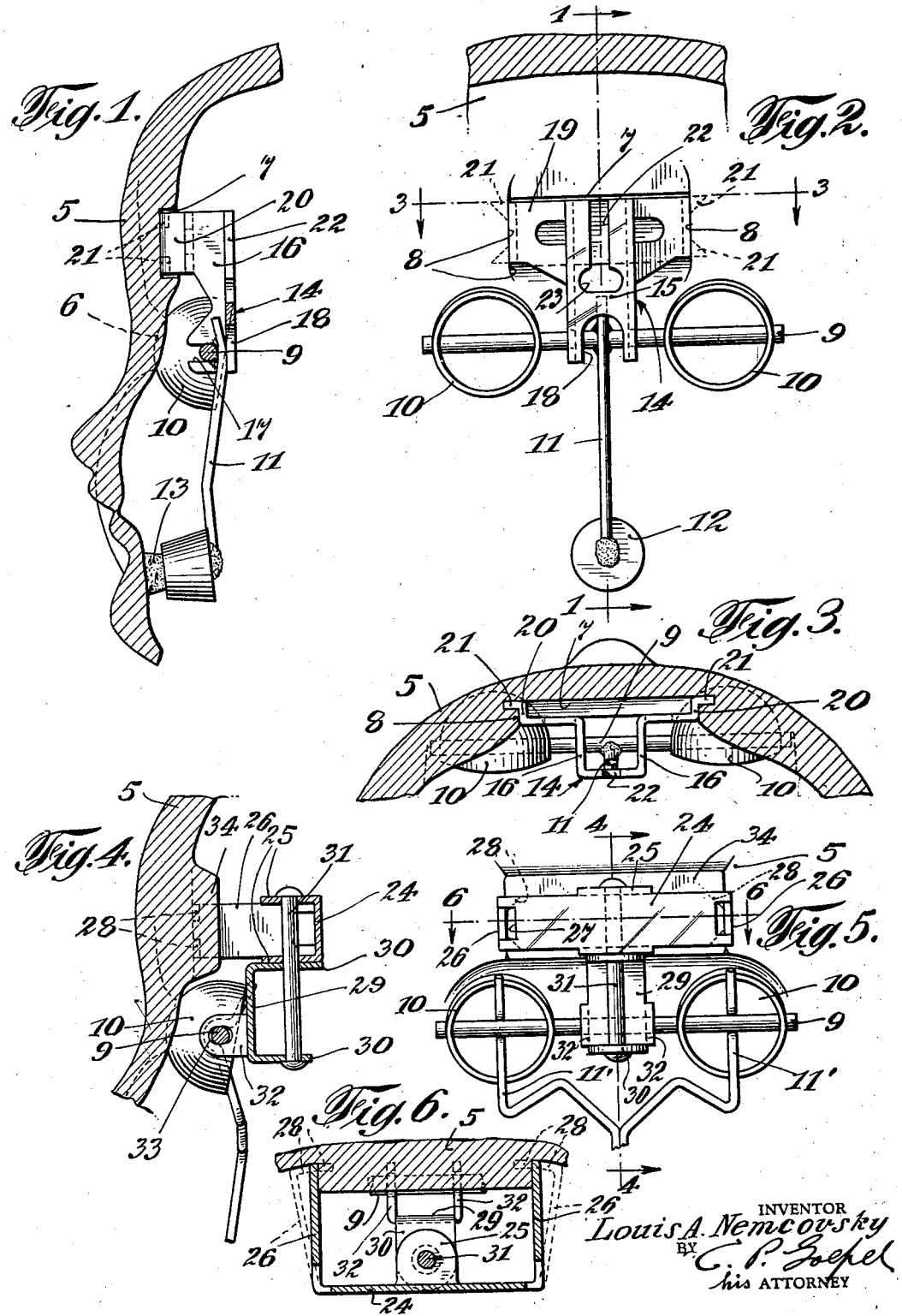
INVENTOR
Louis A. Nemcovsky
BY C. P. Goepel
his ATTORNEY Aug. 18, 1931. L. A. NEMCOVSKY 1,819,035
EYE MOUNTING FOR DOLLS
Original Filed May 13, 1927   3 Sheets-Sheet 2
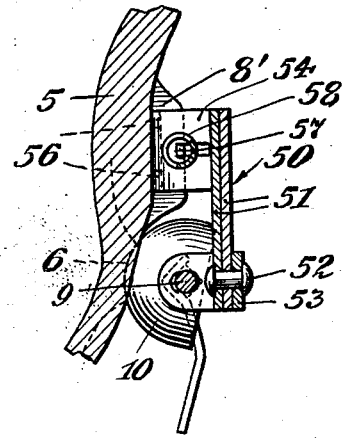
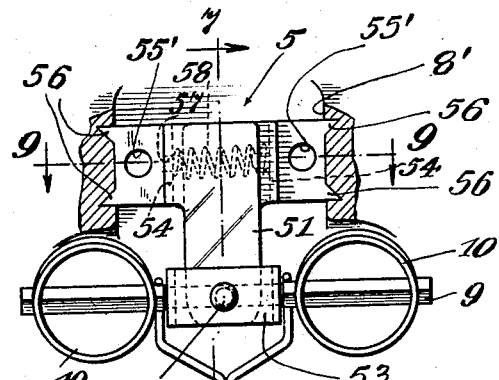
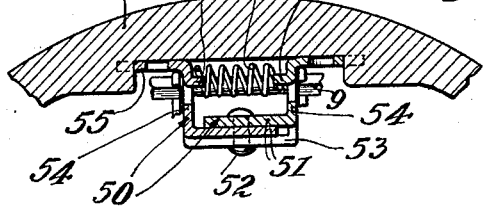
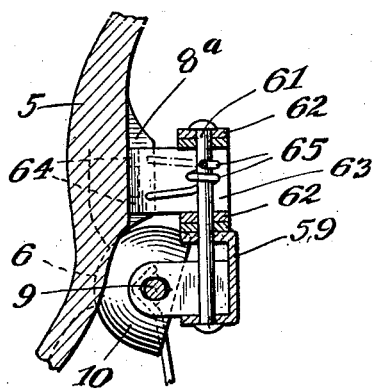
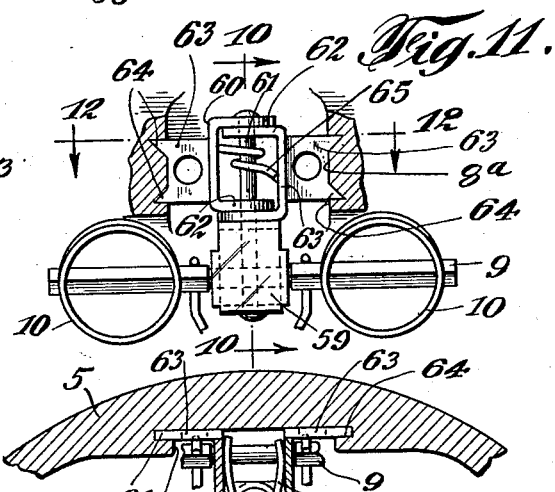
INVENTOR
Louis A. Nemcovsky
BY
his ATTORNEY

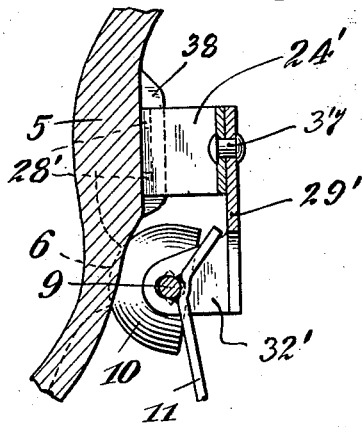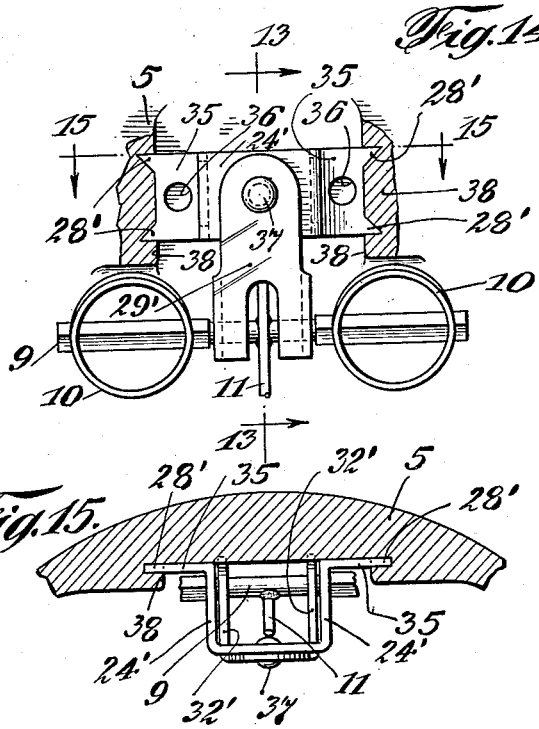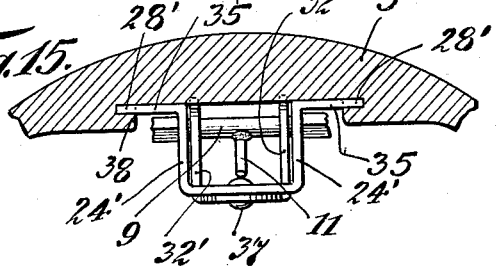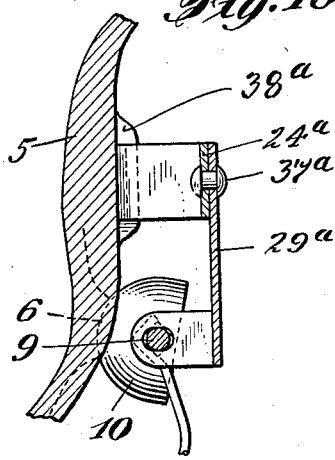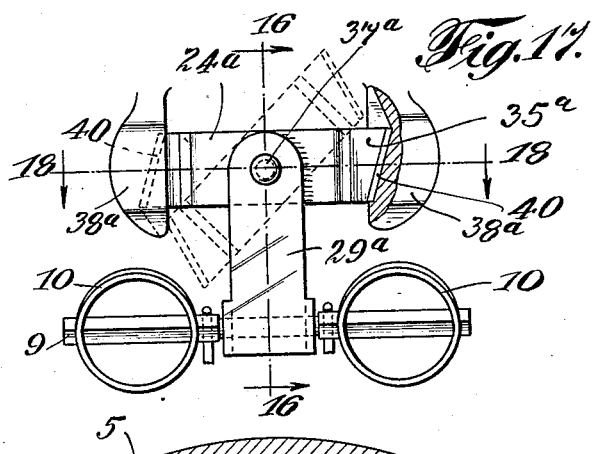

Patented Aug. 18, 1931

1,819,035

UNITED STATES PATENT OFFICE

LOUIS A. NEMCOVSKY, OF NEW YORK, N. Y., ASSIGNOR, BY MESNE ASSIGNMENTS, TO MARGON CORPORATION, OF NEW YORK, N. Y., A CORPORATION OF NEW YORK

EYE MOUNTING FOR DOLLS

Application filed May 13, 1927, Serial No. 191,078. Renewed July 11, 1929.

This invention relates to eye mountings for dolls, and has for its primary object and purpose to provide a supporting means for an oscillatory eye setting which may be produced at low manufacturing cost and may be easily, quickly and securely attached to the wall of the doll head to sustain the eye setting in proper cooperative relation with the eye openings in the head wall and permit of a free non-binding movement of the eye members while obviating the possibility of the complete displacement of the eye setting from its operative position.

It is also another object of the invention in certain embodiments thereof to provide an eye mounting having relatively movable parts, one of which carries the attaching means for the mounting, and said parts being automatically self-adjusting in the engagement of the attaching means with the doll head wall to compensate for possible mechanical inaccuracies in the spaced eye sockets, or their possible non-symmetrical relation to the molded facial features of the head wall.

With the above and other objects in view, the invention consists in the improved eye mounting for dolls, and in the form, construction and relative arrangement of the several parts thereof as will be hereinafter more fully described, illustrated in the accompanying drawings, and subsequently incorporated in the subjoined claims.

In the drawings, wherein I have illustrated several simple and practical embodiments of the device, and in which similar reference characters designate corresponding parts throughout the several views,—

Figure 1 is a vertical sectional view through the front wall of a doll head taken substantially on the line 1—1 of Fig. 2 and illustrating one embodiment of the improved eye mounting;

Fig. 2 is a rear elevation thereof;

Fig. 3 is a horizontal sectional view taken on the line 3—3 of Fig. 2;

Fig. 4 is a vertical section similar to Fig. 1 taken on the line 4—4 of Fig. 5, showing another embodiment of the device;

Fig. 5 is a rear elevation of the modified construction;

Fig. 6 is a horizontal sectional view taken on the line 6—6 of Fig. 5;

Fig. 7 is a vertical section taken on the line 7—7 of Fig. 8 illustrating another form of the invention;

Fig. 8 is a rear elevation thereof;

Fig. 9 is a horizontal section taken on the line 9—9 of Fig. 8;

Fig. 10 is a vertical section of a further alternative embodiment of the invention taken on the line 10—10 of Fig. 11;

Fig. 11 is a rear elevation of the construction shown in Fig. 10;

Fig. 12 is a horizontal section taken on the line 12—12 of Fig. 11;

Fig. 13 is a vertical section taken on the line 13—13 of Fig. 14, showing still another form of the device;

Fig. 14 is a rear elevation thereof;

Fig. 15 is a horizontal section taken on the line 15—15 of Fig. 14;

Fig. 16 is a vertical section illustrating another embodiment of the invention taken on the line 16—16 of Fig. 17;

Fig. 17 is a rear elevation thereof, and

Fig. 18 is a horizontal section taken on the line 18—18 of Fig. 17.

Referring in detail to the drawings, and more particularly to Figs. 1, 2 and 3 thereof, 5 designates the front wall of a doll head which may be molded or fashioned from wood pulp, papier mâché or other suitable composition material to provide the customary facial features on the outer surface thereof in appropriate relation to each other. Thereafter the eye openings are formed through the head wall and a concave eye member receiving socket is milled in the inner surface of said wall at each of the eye openings as indicated at 6.

Above the eye openings and between the same the wall 5 of the doll head is provided with a rectangular horizontally elongated recess 7, the spaced end surfaces 8 of which are located approximately in equi-distant spaced relation from the vertical center line of the head wall.

For purposes of illustration, I have shown a conventional form of oscillatory eye setting adapted to be mounted and supported in suspended relation to the wall 5 of the doll head. As shown, this eye setting includes a horizontally positioned rod or axis 9 upon the opposite ends of which the eye members 10 are suitably secured, said eye members being spaced apart for engagement in the respective eye sockets 6 of the doll head wall. A pendulum rod 11 is fixed at its upper end centrally to the rod 9 and is provided at its lower end with a suitable weight 12 carrying a resilient bumper 13 for engagement with the front wall of the doll head to yieldingly cushion the swinging movement of the eye setting in one direction to dispose the eye members in their open positions with the pupils printed or otherwise delineated thereon visible through the respective eye openings in the wall 5.

The mounting for the eye setting whereby the same is operatively suspended from the doll head wall, in this embodiment of the device consists of a combined supporting and attaching member stamped from a suitably cut and shaped sheet metal blank to provide a central channel shaped part 14 consisting of the body wall 15 and the side flanges 16 extending the full length thereof. These flanges at one of their ends are provided with the horizontal notches or recesses 17 opening upon the longitudinal edges of said flanges and said end of the body wall 15 is also provided with the recess 18 to accommodate the upper end of the pendulum rod 11 in the swinging movement of the eye setting.

The other ends of the flanges 16 are provided with lateral extensions 19 projecting in opposite directions from the respective flanges, each of said extensions being provided at its outer end with an angular bend 20 forming an abutment shoulder, and this angular bend is provided with vertically spaced laterally projecting attaching spurs 21.

The upper part of the body wall 14 is cut away or provided with a central longitudinally extending slot 22 horizontally enlarged at its lower end as at 23 whereby the opposite side portions of said body wall are separated from each other so that they will have a relatively yielding movement upon inward pressure against the side flanges 16.

In the use of the device above described, the rod or axis 9 of the oscillatory eye setting is first arranged in the bearing recesses or seats 17 in the flanges 16 of the supporting and attaching member. This member together with the eye setting is then inserted upwardly through the neck opening of the doll head, and by the sense of touch, the operator locates the respective eye members 10 in the sockets 6 of the doll head wall, the supporting member being held in an angular position relative to the pendulum rod 11 and with the yieldable bumper 13 engaged against the inner side of the head wall. The supporting member is then moved relative to the eye setting while with the thumb and finger, the operator exerts an inward pressure on the flanges 16, thus positioning the spurs 21 so that they may be engaged within the internal recess 7 of the head wall and against the base thereof, at which time the body wall 15 of the channel shaped part will be disposed in a plane substantially parallel with the plane of the head wall 5, and the rear ends of the recesses or seats 17 will be out of contact with the rear side of the rod 9 thus permitting the eye members 10 to loosen or recede from the walls of the sockets 6. The operator then releases the pressure against the side flanges 16 and these flanges and the upper spaced side portions of the wall 14 resume their normal relative positions and the spurs 21 are resiliently urged in opposite directions and embedded in the end walls 8 of the recess 7 until the abutment shoulders 21 contact with these end walls. These abutment shoulders and the spurs 21 thus rigidly secure the supporting member in its attached position with respect to the head wall. In the event that the eye sockets 6 may extend to different depths from the inner surface of the head wall or the wall itself should be of relatively different thicknesses at the sockets, the rod or axis 9 may readily assume a position in the bearing seats 17 out of parallel relation to the doll head wall so that the eye members will automatically accommodate themselves to such mechanical inaccuracies. Also as above explained, it will be seen that the eye members are not tightly held against the walls of the eye sockets so that they may have a free non-binding oscillatory movement. As the supporting member and the attaching means therefor is produced from a relatively simple sheet metal stamping, it will be apparent that a device of this kind can be very rapidly and accurately produced at small manufacturing cost. The mounting is also easily and quickly attachable to the doll head wall without requiring the exercise of special skill.

In the construction illustrated in Figs. 4 to 6 of the drawings, I have shown another embodiment of the invention wherein the supporting and attaching means for the eye setting is in the form of two separate sheet metal stampings, connected to each other for relative angular movement. In this construction, the attaching member is in the form of an elongated sheet metal plate 24 which is centrally provided on its opposite longitudinal edges with the angularly projecting lugs or ears 25. At its opposite ends this plate is formed with the relatively long arms 26, the metal plate at the juncture of said arms therewith being provided with the openings indicated at 27 to more readily permit of the movement of said arms with respect to the plate 24. Each of the arms 26 is provided at its free end with inwardly projecting vertically spaced spurs 28. The supporting member for the eye setting is in the form of a U-shaped sheet metal bracket 29 having vertically spaced apertured ears 30. The apertures in these ears are adapted to be positioned in registering relation with similar apertures in the ears 25 of the attaching member, to receive the vertically disposed connecting pin 31. The intermediate part of the bracket member 29 is provided on its opposite side edges with the angularly extending lugs 32 having the horizontally elongated openings 33 to receive the rod or axis of the eye setting. In this case, the weighted pendulum of the eye setting is in the form of a heavy wire having spaced branches 11' engaged with the rear edges of the respective eye members and suitably fixed to the supporting rod or axis therefor.

In this construction the front wall of the doll head above and between the eye openings is internally formed with a lug or projection 34. In arranging the device within the doll head, the arms 26 of the attaching member are in the normal positions shown in dotted lines in Fig. 6 of the drawings, and after the eye members have been seated in the sockets of the head wall, the attaching member and the bracket 29 are swung upwardly and forwardly on the rod or axis of the eye setting until the ends of the arms 26 abut against the head wall at the opposite ends of the projection 34 thereon. The operator then, by pressure of the thumb and fingers, forces the arms 26 inwardly until they extend substantially at right angles to the plane of the plate 24, and thereby embeds the spurs 28 in the opposite ends of the projection 34. In this manner, the attaching member is rigidly connected with the front wall of the doll head. The supporting bracket 29 for the eye setting being pivotally connected by the pin 31 with the attaching member may move angularly with respect thereto as may be required to compensate for variations in thickness of the doll head wall and maintain a proper cooperating relation between the spaced eye members and the respective eye openings.

In Figs. 7, 8 and 9 of the drawings, I have shown an attaching means for the eye mounting which consists of two similar members 50 each in the form of a sheet metal stamping having an arm 51, said arms being lapped upon each other and pivotally connected by the pin or rivet 52 which also connects said ends of the arms to the intermediate part of the U-shaped bracket member 53 in the forwardly projecting ends of which the rod or axis of the oscillatory eye setting is supported. The other or upper end of each of the arms 51 is provided with an angularly projecting part 54 on its outer edge terminating in a lateral extension 55 having the vertically spaced spurs 56. Each of the parts 54 has a lug 57 struck inwardly therefrom upon which the opposite ends of an expansion spring 58 are engaged. In applying this form of the device within the doll head, the spaced relatively movable parts of a suitable tool are adapted to be engaged in the openings 55' in the extensions 55 whereby the two members 50 may be forced inwardly towards each other at their upper ends against the action of the spring 58 to position the spurs 56 whereby the extensions 55 may be arranged between the spaced vertical surfaces 8' on the inner side of the head wall. Upon then removing the tool or releasing the inward pressure against the members 50, the spring 58 will expand and impale or embed the spurs 56 in said surfaces 8', thereby securely fixing the mounting in its attached position.

In Figs. 10, 11 and 12 of the drawings, another construction is disclosed wherein the bracket member 59 which is similar in form to that shown in Fig. 4 is connected with relatively movable attaching members 60 by means of a vertical pivot rod 61. Each of these attaching members consists of a stamped sheet metal plate provided upon its opposite longitudinal edges at one of its ends with the angularly projecting ears 62, the corresponding ears of said members being lapped upon each other and apertured to receive the vertical pivot pin 61. At its other end each of the members 60 is provided with a lateral extension 63 terminating in the vertically spaced spurs 64. A coil spring 65 surrounds the pivot rod 61 between said attaching members, the ends of said spring bearing against the respective members and normally acting to urge the ends thereof provided with the extensions 63 away from each other. Thus, in applying this form of the device, it will be understood that when the mounting is inserted within the doll head, pressure is applied against the attaching members 60 to force the same inwardly and tension the spring 65, thereby positioning the extensions 63 so that the same may be arranged between the spaced internal surfaces 8ª on the doll head wall. Upon then releasing the pressure against the members 60, the spring 65 acts to urge the extensions 63 thereof laterally and embed or impale the spurs 64 in the spaced surfaces 8ª, whereby the mounting is fixedly attached in operative position relatively to the doll head.

In Figs. 13, 14 and 15, I have shown another construction wherein the bracket 29' is in the form of a sheet metal plate provided at one of its ends with the angularly projecting slotted ears 32' to receive the rod or axis of the eye setting. The attaching member 24' in this construction is in the form of a U-shaped metal plate, the parallel arms of which are provided with the lateral extensions 35, each having vertically spaced spurs 28' and preferably provided with openings 36 to receive relatively movable parts of a suitable tool. The upper end of the bracket plate 29' is connected with the intermediate part of the U-shaped attaching member 24' by a horizontal pivot stud 37.

In the use of this last described construction, the inner side of the doll head wall above the eye openings is provided with spaced projections 38 thereon. When the mounting is inserted within the doll head, the parallel arms of the attaching member 24' and the extensions thereof are sprung inwardly towards each other so that said extensions may be arranged between the spaced lugs 38. Upon then removing the parts of the tool from the openings 36 in said extensions, the latter will return to their normal positions and the spurs 28' thereof will become embedded in the opposed surfaces of the spaced lugs 38, thus fixedly securing the mounting in its attached position. As the supporting member 29' with the eye setting mounted therein may have an angular movement about the pivot 37 with respect to the attaching member, the eye members of the setting can be properly fitted within the respective eye sockets, even though a horizontal line intersecting the centers of the sockets may not extend exactly at right angles to the vertical center line of the head and at other than a 90° angle with respect to the opposed vertical surfaces of the lugs 38.

In Figs. 16, 17 and 18, the supporting bracket 29ª for the eye setting may be of substantially the same construction as that last described and connected at its upper end by the pivot 37ª to the intermediate portion of the U-shaped attaching member 24ª. In this case however, this attaching member may be made of relatively heavy non-resilient stock, and the parallel arms thereof are provided at their ends with the short lateral extensions 35ª, the end edges of which are vertically inclined along parallel lines and sharpened to a knife edge as shown at 40. Also, in the use of this form of the invention, the doll head wall is provided with the internal spaced lugs 38ª providing substantially parallel opposed vertical surfaces.

When the device is inserted within the doll head, the attaching member 24ª is arranged in the angular position with respect to the bracket member 29ª as shown in dotted lines in Fig. 17 so that the extensions 35ª may be positioned between the lugs 38ª and in contact with the wall of the doll head. The spaced eye members of the setting having been positioned in the respective sockets the member 24ª is then turned to a horizontal position, and the obliquely inclined cutting edges 40 of the extensions 35ª will thereby cut into the spaced lugs 38ª and become deeply embedded in the material thereof, as shown in full lines in Fig. 17. Thus, it will be seen that this construction provides for a very rigid and secure attachment of the member 24ª which can be quickly effected without distorting said member from its normal form.

From the foregoing description considered in connection with the accompanying drawings, the construction, manner of application and use and the several advantages of the disclosed embodiments of my invention will be fully understood. It will be apparent that any one of these devices will satisfactorily subserve the intended purpose of permanently retaining the oscillatory eye setting against possible displacement from its applied position relative to the doll head wall while permitting of a free non-binding oscillating motion of the setting and a movement of the respective eye members in accurate relation to the eye openings formed through the wall of the doll head. As the recess or the spaced projections may be readily formed on the inner side of the head wall in the molding thereof, this provision will not add materially to manufacturing costs. Also, as the mounting consists of relatively simple sheet metal stampings, it will be apparent that such a mounting can be rapidly produced in large quantities and at very low cost. One of the important features common to all of the illustrated embodiments of the invention resides in the location of the rod or axis 9 of the eye setting below and rearwardly of the point of penetration of the spurs of the attaching member into the structure of the head wall and the bearing for said rod or axis positioned centrally between the horizontally spaced attaching spurs. By this arrangement, the tensional strain on the spaced attaching spurs is more or less equally distributed and there is less liability of the head structure breaking away under such strains or the attaching means becoming disengaged or released from its connection with the head wall.

A second feature of importance as shown in certain of the illustrated constructions resides in a provision of the separate supporting bracket for the eye setting connected to the attaching member for pivotal angular movement relative thereto so that even in cases of more or less great discrepancy in the symmetrical location of the eye openings with respect to the molded features of the head wall, the eyes may nevertheless assume a proper operative position relative to said openings.

While I have herein shown and described several simple and practical embodiments of my present improvements, it will nevertheless be understood that the essential features thereof might also be incorporated in various other alternative constructions, and I accordingly reserve the privilege or resorting to all such legitimate changes therein as may

I claim:

1. In combination with a doll head having spaced eye openings in its front wall and spaced vertical surfaces internally formed on said wall, spaced attaching parts resiliently connected for relative lateral movement and adapted to be forced under pressure towards each other and positioned between said spaced vertical surfaces on the head wall, each of said parts having means adapted to impale the opposed vertical surface of said wall upon the release of such pressure to thereby secure said attaching parts in fixed relation to the wall, and a part connected with and depending from said attaching parts having bearing means positioned in a vertical plane between said spaced vertical surfaces on the head wall and adapted to receive the axis of an oscillatory eye setting.

2. An eye mounting for dolls comprising means with laterally extending ends for attaching the mounting to the front wall of a doll head above the eye openings therein, said ends being adapted to engage oppositely facing surfaces on said walls, and a bearing bracket to receive the axis of an oscillatory eye setting pivotally connected with said attaching means for angular movement relative thereto.

3. An eye mounting for dolls comprising attaching means consisting of complementary parts each having means with laterally extending ends adapted to be embedded in oppositely facing surfaces formed on the front wall of a doll head to secure the mounting in attached relation thereto, a bearing member to receive the axis of an oscillatory eye setting, and a common pivotal connection between said attaching parts and the bearing member.

4. An eye mounting for dolls comprising attaching means consisting of relatively movable attaching parts each having means with laterally extending ends adapted to be embedded in oppositely facing surfaces formed on the front wall of a doll head to secure the mounting in attached relation thereto, a bearing member for the axis of an oscillatory eye setting, and a vertically disposed pivot connecting said attaching parts to each other and with the bearing member.

5. An eye mounting for dolls comprising attaching means with laterally extending ends adapted to be secured to the inner side of the front wall of a doll head in fixed relation thereto, said ends being adapted to engage oppositely facing surfaces on said walls, and a member pivotally connected to the attaching means and provided with means to support an oscillatory eye setting below the attaching means, said member and the eye setting adapted for unitary angular movement relative to said attaching means and the doll head wall.

6. An eye mounting for dolls comprising attaching means consisting of complementary parts each having angularly related portions, corresponding portions of said attaching parts being positioned in the same plane and provided with means adapted to be embedded in oppositely facing surfaces of a doll head wall, spring means arranged between said attaching parts resisting movement thereof from their attaching positions, a member adapted to receive and support an oscillatory eye setting, and a common pivotal connection between the two attaching parts and said supporting member and permitting of the angular movement of said member and the attaching means relative to each other.

In testimony that I claim the foregoing as my invention, I have signed my name hereto.

LOUIS A. NEMCOVSKY.